Patented July 7, 1925.

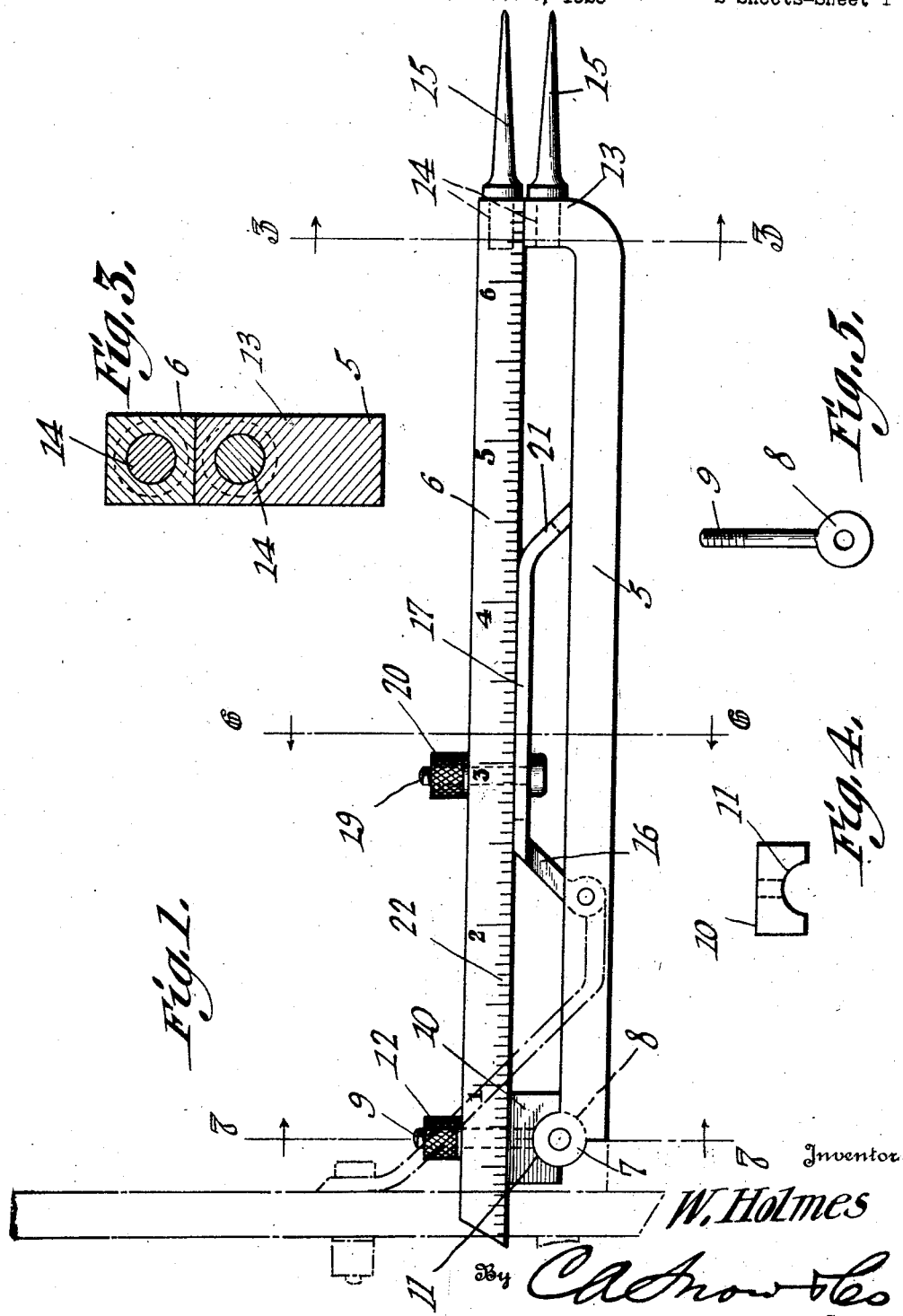

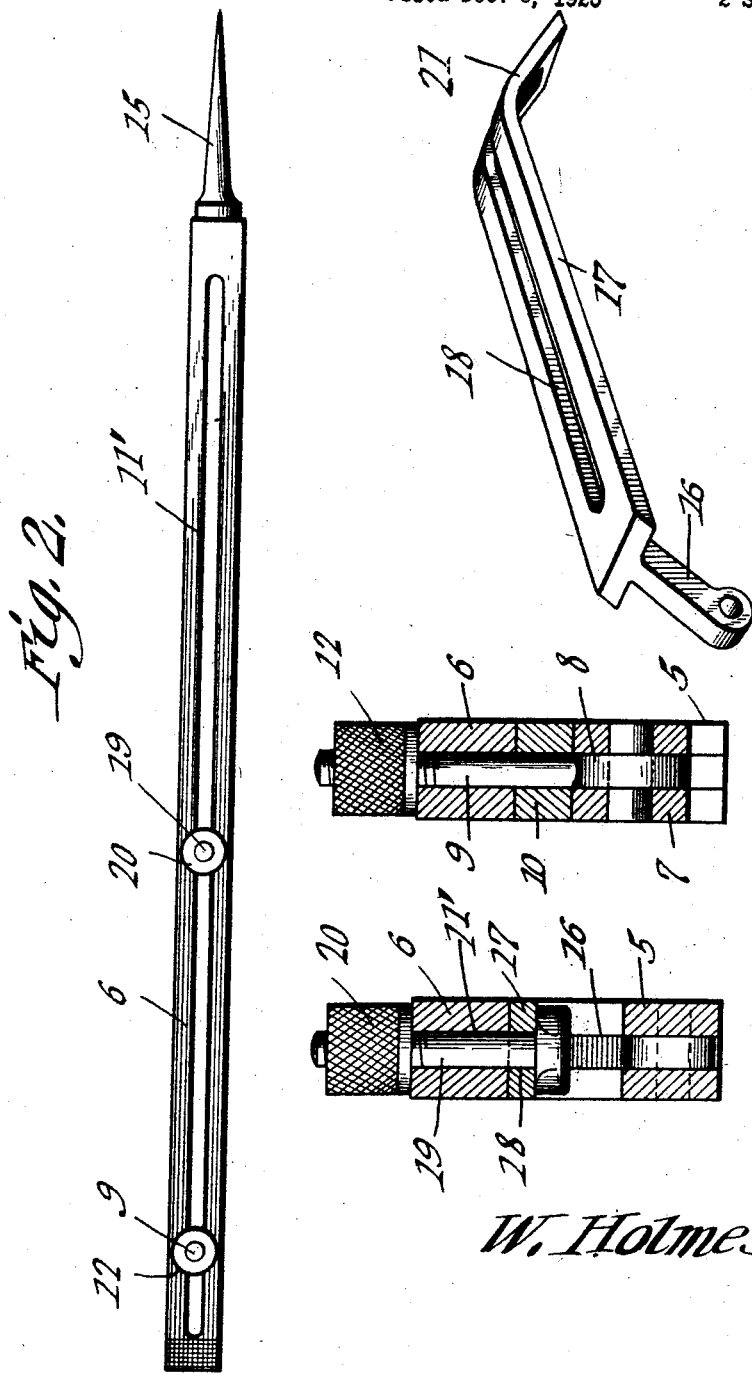

1,544,908

UNITED STATES PATENT OFFICE.

WILLIAM HOLMES, OF BELPRE, OHIO.

COMBINATION TOOL.

Application filed December 8, 1923. Serial No. 679,410.

*To all whom it may concern:*

Be it known that I, WILLIAM HOLMES, a citizen of the United States, residing at Belpre, in the county of Washington and State of Ohio, have invented a new and useful Combination Tool, of which the following is a specification.

The present invention relates to a combined compass or divider, the primary object of the invention being to provide a device of this character which may be adjusted for use as a ruler or square.

Another important object of the invention is to provide a device of this character wherein the leg members thereof may be moved in parallel relation with each other and secured in such position whereby the device may be conveniently carried.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view of a device constructed in accordance with the present invention.

Figure 2 is a plan view of the adjustable leg member of the device.

Figure 3 is a sectional view taken on line 3—3 of Figure 1.

Figure 4 is a detail view of the movable connecting block.

Figure 5 is an elevational view of the eye bolt employed for connecting the leg members.

Figure 6 is a sectional view taken on line 6—6 of Figure 1.

Figure 7 is a sectional view taken on line 7—7 of Figure 1.

Figure 8 is a perspective view of the connecting arm between the leg members.

Referring to the drawings in detail, the device embodies leg members 5 and 6 respectively, the leg member 5 being provided with spaced ears 7 between which the head 8 of the eye bolt 9 is positioned for pivotal movement.

A block 10 formed with a curved portion 11, is fitted over the head 8 of the eye bolt 9 and engages the leg members 6 to hold the leg members 5 and 6 in spaced relation with each other, the eye bolt passing through an opening in the leg 6. A knurled nut 12 is positioned on the threaded portion of the eye bolt 9 and is designed to bind against the leg 6, to hold the leg member 6 against movement.

The opposite end of the leg member 5 extends upwardly as at 13, the length of the upwardly extended portion being equal to the height of the block 10, so that the legs 5 and 6 will be held in parallel relation when they are moved to positions as shown by Figure 1.

The free ends of the leg members 5 and 6 are formed with openings to receive the extensions 14 of the divider points 15, whereby the divider points may be readily and easily removed and replaced by marking points if desired.

Formed in the leg member 5 is an opening to receive one end of the extension 16 forming a part of the connecting arm 17 which is also formed with a slotted portion 18 to receive the bolt 19 that extends through the slot 11' of the leg 6 to connect the arm 17 and leg 6, a knurled nut 20 being provided on the bolt 19 to set up a binding action between the arm 17 and leg 6 and prevent movement of one member with respect to the other member.

Forming a part of the arm 17 is an angularly disposed end section 21 which is adapted to move to a position in parallel relation with and engage one side of the leg member 6 as clearly illustrated in dotted lines in Figure 1 of the drawings, so that the leg 6 may be moved to a position at right angles with respect to the leg member 5 and the device used as a rule or square, by placing the device on the outer surfaces of the members to be squared.

When the leg members have been adjusted in a manner as described, it is obvious that the knurled nut 20 should be rotated to set up a binding action between the arms 17 and leg member 6 to insure against movement of the leg member, 6 with respect to the leg member 5.

It might be further stated that graduations 22 are provided on the leg members 6 for measuring purposes.

I claim:—

A measuring device comprising a pair of leg members, one of the leg members having a slot formed therein, an eye bolt pivotally supported at one end of one leg member, and disposed in the slot of the opposite leg member, a connecting arm having an end portion extending at an angle and having pivotal connection with one of the leg members, said connecting arm having a slotted portion adapted to register with the first mentioned slots, a bolt extending through the registering slotted portion of the connecting arm and leg member, said leg members adapted to move longitudinally with respect to each other, said connecting arm adapted to restrict movement of the arms with respect to each other, and nuts on the bolts for securing the arms in their positions of adjustment.

In testimony that I claim the foregoing as my own, I have hereto affixed my signature in the presence of two witnesses.

WILLIAM HOLMES.

Witnesses:
S. O. HOLLIDAY,
L. M. PARKER.